(12) United States Patent
Katada et al.

(10) Patent No.: US 10,030,107 B2
(45) Date of Patent: Jul. 24, 2018

(54) CROSSLINKING RUBBER COMPOSITION AND CROSSLINKED RUBBER PRODUCTION METHOD

(71) Applicant: ZEON CORPORATION, Tokyo (JP)

(72) Inventors: Arinobu Katada, Tokyo (JP); Yoshio Fukumine, Tokyo (JP); Atsuhiro Shiono, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 15/116,401

(22) PCT Filed: Mar. 13, 2015

(86) PCT No.: PCT/JP2015/057550
§ 371 (c)(1),
(2) Date: Aug. 3, 2016

(87) PCT Pub. No.: WO2015/146650
PCT Pub. Date: Oct. 1, 2015

(65) Prior Publication Data
US 2017/0015797 A1   Jan. 19, 2017

(30) Foreign Application Priority Data

Mar. 25, 2014 (JP) ................ 2014-062532

(51) Int. Cl.
| | |
|---|---|
| C08L 9/02 | (2006.01) |
| C08J 3/24 | (2006.01) |
| C08F 236/12 | (2006.01) |
| C08K 5/205 | (2006.01) |
| C08K 5/17 | (2006.01) |
| C08L 13/00 | (2006.01) |
| C08L 15/00 | (2006.01) |
| C08F 220/44 | (2006.01) |

(52) U.S. Cl.
CPC .............. *C08J 3/24* (2013.01); *C08F 236/12* (2013.01); *C08K 5/17* (2013.01); *C08K 5/205* (2013.01); *C08L 13/00* (2013.01); *C08L 15/005* (2013.01); *C08F 220/44* (2013.01); *C08J 3/246* (2013.01); *C08J 2309/02* (2013.01); *C08L 9/02* (2013.01)

(58) Field of Classification Search
CPC ... C08L 15/005; C08L 9/02; C08J 3/24; C08J 3/246; C08J 2309/02; C08K 5/17; C08K 5/205; C08F 236/12
See application file for complete search history.

(56) References Cited

U.S. PATENT DOCUMENTS

| | | | | |
|---|---|---|---|---|
| 6,657,014 | B1 * | 12/2003 | Mori ...................... | C08K 5/17 |
| | | | | 525/194 |
| 2005/0101737 | A1 | 5/2005 | Pazur et al. | |
| 2010/0029857 | A1 | 2/2010 | Soddemann et al. | |
| 2010/0168302 | A1 | 7/2010 | Nagamori et al. | |
| 2011/0301300 | A1 * | 12/2011 | Iizuka ..................... | C08C 19/02 |
| | | | | 525/328.9 |
| 2012/0214945 | A1 | 8/2012 | Emori | |
| 2013/0280459 | A1 | 10/2013 | Nakashima et al. | |

FOREIGN PATENT DOCUMENTS

| | | |
|---|---|---|
| CN | 101331183 A | 12/2008 |
| CN | 101629005 A | 1/2010 |
| CN | 102575066 A | 7/2012 |
| CN | 103380173 A | 10/2013 |
| JP | 2005-029790 A | 2/2005 |
| JP | 2008-195881 A | 8/2008 |
| WO | 2010/087431 A1 | 8/2010 |

OTHER PUBLICATIONS

Feb. 8, 2017 Search Report issued in European Patent Application No. 15769828.3.
May 26, 2015 International Search Report issued in International Patent Application No. PCT/JP2015/057550.
Oct. 6, 2016 International Preliminary Report on Patentability issued in International Patent Application No. PCT/JP2015/057550.
Suguru Ito; "Development of new hydrogenated nitrile rubber (HNBR);" The Journal of Society of Rubber Science and Technology; 2002; vol. 75; No. 1; pp. 32-36.

* cited by examiner

*Primary Examiner* — Roberto Rabago
(74) *Attorney, Agent, or Firm* — Oliff PLC (57) ABSTRACT

A cross-linked rubber is excellent in both fuel oil resistance and cold resistance. A cross-linkable rubber composition contains: a nitrile group-containing copolymer rubber [A] including less than 30 wt % α,β-ethylenically unsaturated nitrile monomer units (a1), conjugated diene monomer units (b1), and α,β-ethylenically unsaturated dicarboxylic acid monoester monomer units (d1), wherein at least part of the conjugated diene monomer units (b1) is hydrogenated; a nitrile group-containing copolymer rubber [B] including not less than 30 wt % α,β-ethylenically unsaturated nitrile monomer units (a2) and conjugated diene monomer units (b2), wherein at least part of the conjugated diene monomer units (b2) may be hydrogenated; and an amine-based crosslinking agent.

6 Claims, 2 Drawing Sheets

FIG. 3

CROSSLINKING RUBBER COMPOSITION AND CROSSLINKED RUBBER PRODUCTION METHOD

TECHNICAL FIELD

The present invention relates to a (i) cross-linkable rubber composition and a (ii) method for producing a cross-linked rubber.

BACKGROUND ART

In general, a nitrile group-containing highly saturated copolymer rubber typified by a hydrogenated acrylonitrile-butadiene copolymer rubber is superior in heat resistance, ozone resistance, and other properties to a typical nitrile group-containing copolymer rubber such as an acrylonitrile-butadiene copolymer rubber. For this reason, the nitrile group-containing highly saturated copolymer rubber is used for a wide variety of automotive parts such as fuel oil hoses, O-rings, and in-oil belts.

O-rings incorporated into, for example, automotive engines are used in environments where the O-rings are subjected to fuel oils such as gasoline. Thus, there has been a demand for O-rings having fuel oil resistance to such a degree that they do not swell in contact with the fuel oils. For example, Patent Literature 1 has proposed, as a rubber compound that meets such a demand, a polymer blend containing (i) at least one hydrogenated nitrile rubber, (ii) at least one hydrogenated terpolymer rubber, (iii) at least one salt of a strong base and a weak acid comprising a group I metal, and (iv) at least one olefin/vinyl acetate and/or olefin/acrylate rubber.

Furthermore, O-rings incorporated into, for example, automotive engines used in cold climate areas are required to have cold resistance to such a degree that they have rubber elasticity in low-temperature environments. Providing O-rings having both cold resistance and fuel oil resistance has become a challenge to be addressed. It is generally known that, as a nitrile content of a nitrile-containing highly saturated copolymer rubber is reduced for the purpose of improving cold resistance, fuel oil resistance decreases accordingly. An approach for improving those properties is, for example, controlling a molecular structure of a hydrogenated nitrile rubber, as described in Non-patent Literature 1.

CITATION LIST

Patent Literature

[Patent Literature 1]
Japanese Patent Application Publication Tokukai No. 2005-29790 (Publication date: Feb. 3, 2005)

Non-Patent Literature

[Non-Patent Literature 1]
The Journal of the Society of Rubber Science and Technology, Japan, Vol. 75, pp. 32-36 (2002)

SUMMARY OF INVENTION

Technical Problem

However, the molecular structure control described in Non-patent Literature 1 is not technically easy and results in increase of manufacturing costs. In order to solve such a problem, there is a need for a novel cross-linkable rubber composition that is obtained by a method other than the molecular-structure controlling method and is excellent in cold resistance and fuel oil resistance.

In view of this, it is an object of the present invention to provide a cross-linkable rubber composition that is excellent in both fuel oil resistance and cold resistance and has an excellent balance of fuel oil resistance and cold resistance.

Solution to Problem

As a result of diligent studies, the inventors of the present invention accomplished the present invention by finding that the above object is achievable with a cross-linked rubber that is obtained by cross-linking a cross-linkable rubber composition containing: a nitrile group-containing copolymer rubber [A] including less than 30 wt % $\alpha,\beta$-ethylenically unsaturated nitrile monomer units (a1), conjugated diene monomer units (b1), and $\alpha,\beta$-ethylenically unsaturated dicarboxylic acid monoester monomer units (d1), wherein at least part of the conjugated diene monomer units (b1) is hydrogenated; a nitrile group-containing copolymer rubber [B] including not less than 30 wt % $\alpha,\beta$-ethylenically unsaturated nitrile monomer units (a2) and conjugated diene monomer units (b2), wherein at least part of the conjugated diene monomer units (b2) may be hydrogenated; and an amine-based cross-linking agent.

That is, a cross-linkable rubber composition in accordance with the present invention contains: a nitrile group-containing copolymer rubber [A] including less than 30 wt $\alpha,\beta$-ethylenically unsaturated nitrile monomer units (a1), conjugated diene monomer units (b1), and $\alpha,\beta$-ethylenically unsaturated dicarboxylic acid monoester monomer units (d1), wherein at least part of the conjugated diene monomer units (b 1) is hydrogenated; a nitrile group-containing copolymer rubber [B] including not less than 30 wt % $\alpha,\beta$-ethylenically unsaturated nitrile monomer units (a2) and conjugated diene monomer units (b2), wherein at least part of the conjugated diene monomer units (b2) may be hydrogenated; and an amine-based cross-linking agent.

Advantageous Effects of Invention

According to the present invention, it is possible to obtain a cross-linked rubber that is excellent in both fuel oil resistance and cold resistance and has an excellent balance of fuel oil resistance and cold resistance.

DESCRIPTION OF EMBODIMENTS

<Cross-Linkable Rubber Composition>
A cross-linkable rubber composition in accordance with the present invention contains: a nitrile group-containing copolymer rubber [A] including less than 30 wt % $\alpha,\beta$- ethylenically unsaturated nitrile monomer units (a1), conjugated diene monomer units (b1), and α,β-ethylenically unsaturated dicarboxylic acid monoester monomer units (d1), wherein at least part of the conjugated diene monomer units (b 1) is hydrogenated; a nitrile group-containing copolymer rubber [B] including not less than 30 wt % α,β-ethylenically unsaturated nitrile monomer units (a2) and conjugated diene monomer units (b2), wherein at least part of the conjugated diene monomer units (b2) may be hydrogenated; and an amine-based cross-linking agent. With the use of the cross-linkable rubber composition in accordance with the present invention, it is possible to obtain a cross-linked rubber that is excellent in both fuel oil resistance and cold resistance and has an excellent balance of fuel oil resistance and cold resistance.

[Nitrile Group-Containing Copolymer Rubber [A]]

The nitrile group-containing copolymer rubber [A] contained in the cross-linkable rubber composition in accordance with the present invention includes less than 30 wt % α,β-ethylenically unsaturated nitrile monomer units (a1), conjugated diene monomer units (b1), and α,β-ethylenically unsaturated dicarboxylic acid monoester monomer units (d1), wherein at least part of the conjugated diene monomer units (b 1) is hydrogenated.

(α,β-Ethylenically Unsaturated Nitrile Monomer Units (a1))

An α,β-ethylenically unsaturated nitrile monomer (ma1) forming the α,β-ethylenically unsaturated nitrile monomer units (a1) is not limited to a specific one as long as it is an α,β-ethylenically unsaturated compound having nitrile groups. Examples of the α,β-ethylenically unsaturated nitrile monomer (ma1) include acrylonitrile; α-halogenoacrylonitrile such as a-chloroacrylonitrile and α-bromoacrylonitrile; α-alkylacrylonitrile such as methacrylonitrile and ethacrylonitrile. Among these compounds, acrylonitrile and methacrylonitrile are preferable, and acrylonitrile is particularly preferable. As the α,β-ethylenically unsaturated nitrile monomer, two or more of these compounds may be used in combination.

The content of the α,β-ethylenically unsaturated nitrile monomer units (a1) in the nitrile group-containing copolymer rubber [A] is less than 30 wt % and preferably not more than 25 wt % of the total monomer units in the nitrile group-containing copolymer rubber [A]. Further, the content of the α,β-ethylenically unsaturated nitrile monomer units (a1) is preferably not less than 1 wt %, more preferably not less than 10 wt %, and further preferably not less than 15 wt %. If the content of the α,β-ethylenically unsaturated nitrile monomer units (a1) is too high, an obtained cross-linked product tends to have decreased cold resistance. If the content of the α,β-ethylenically unsaturated nitrile monomer units (a1) is too low, an obtained cross-linked product tends to have poor fuel oil resistance.

(Conjugated Diene Monomer Units (b1))

Examples of a conjugated diene monomer (mb1) forming the conjugated diene monomer units (b1) include 1,3-butadiene, isoprene, 2,3-dimethyl-1,3-butadiene, and 1,3-pentadiene. Among these compounds, 1,3-butadiene is preferable.

The conjugated diene monomer units (b1) in the nitrile group-containing copolymer rubber [A] are contained in a state such that at least part of the conjugated diene monomer units (b1) is hydrogenated in the nitrile group-containing copolymer rubber [A]. The percentage of the content of the conjugated diene monomer units (b1) is preferably 20 wt % to 83.5 wt %, more preferably 30.5 wt % to 64.0 wt %, and further preferably 40 wt % to 58.5 wt % of the total monomer units in the nitrile group-containing copolymer rubber [A]. In a case where the percentage of the content of the conjugated diene monomer units (b1) is not less than 20 wt %, an obtained cross-linked rubber will exhibit improvement in rubber elasticity. Meanwhile, in a case where the percentage of the content of the conjugated diene monomer units (b1) is not more than 83.5 wt %, an obtained cross-linked rubber will exhibit improvements in heat aging resistance, chemical resistant stability, and other properties.

Hydrogenation of the conjugated diene monomer units (b1) can be performed by use of a conventionally known hydrogenation catalyst or the like.

Although the degree of hydrogenation is not particularly limited, hydrogenation is performed so that the nitrile group-containing copolymer rubber [A] has an iodine value of preferably not more than 120, more preferably not more than 80, further preferably not more than 25, and particularly preferably not more than 10. In a case where the iodine value is not more than 120, an obtained cross-linked rubber will exhibit improvements in heat resistance and ozone resistance.

(α,β-Ethylenically Unsaturated Dicarboxylic Acid Monoester Monomer Units (d1))

A monomer forming the α,β-ethylenically unsaturated dicarboxylic acid monoester monomer units (d1) in the nitrile group-containing copolymer rubber [A] is not particularly limited as long as it is an α,β-ethylenically unsaturated dicarboxylic acid monoester monomer (md1) having one unesterified and non-substituted (free) carboxyl group.

The non-substituted carboxyl group is used principally for cross-linking. The nitrile group-containing copolymer rubber [A] has the α,β-ethylenically unsaturated dicarboxylic acid monoester monomer units (d1), which is to be cross-linked with the amine-based cross-linking agent. This leads to a high crosslink density, resulting in an obtained cross-linked rubber being excellent in mechanical property such as elongation and being more excellent in compression set resistance and cold resistance.

An organic group, of an ester part of the α,β-ethylenically unsaturated dicarboxylic acid monoester monomer (md1), to be bonded to a carbonyl group through an oxygen atom is preferably an alkyl group, a cycloalkyl group, or an alkylcycloalkyl group. Such an organic group is particularly preferably an alkyl group. The alkyl group that serves as the organic group to be bonded to the carbonyl group through the oxygen atom is preferably an alkyl group having 1 to 12 carbon atoms, and more preferably an alkyl group having 2 to 6 carbon atoms. Further, the cycloalkyl group that serves as the organic group to be bonded to the carbonyl group through the oxygen atom is preferably a cycloalkyl group having 5 to 12 carbon atoms, and more preferably a cycloalkyl group having 6 to 10 carbon atoms. Still further, the alkylcycloalkyl group that serves as the organic group to be bonded to the carbonyl group through the oxygen atom is preferably an alkylcycloalkyl group having 6 to 12 carbon atoms, and more preferably an alkylcycloalkyl group having 7 to 10 carbon atoms. As to the number of carbon atoms in the organic group to be bonded to the carbonyl group through the oxygen atom, in a case where the alkyl group has one or more carbon atoms, the cycloalkyl group has 5 or more carbon atoms, and the alkylcycloalkyl group has 6 or more carbon atoms, a cross-linkable rubber composition obtained by addition of a cross-linking agent will exhibit improvement in processing stability. In a case where the organic group has 12 or less carbon atoms, a cross-linking rate will increase, and an obtained cross-linked rubber will exhibit improvement in mechanical property.

Specific examples of the α,β-ethylenically unsaturated dicarboxylic acid monoester monomer (md1) include: maleic acid monoalkyl esters such as monomethyl maleate, monoethyl maleate, monopropyl maleate, and mono n-butyl maleate; maleic acid monocycloalkyl esters such as monocyclopentyl maleate, monocyclohexyl maleate, and monocycloheptyl maleate; maleic acid monoalkylcycloalkyl esters such as monomethylcyclopentyl maleate and monoethylcyclohexyl maleate; fumaric acid monoalkyl esters such as monomethyl fumarate, monoethyl fumarate, monopropyl fumarate, and mono n-butyl fumarate; fumaric acid monocycloalkyl esters such as monocyclopentyl fumarate, monocyclohexyl fumarate, and monocycloheptyl fumarate; fumaric acid monoalkylcycloalkyl esters such as monomethylcyclopentyl fumarate and monoethylcyclohexyl fumarate; citraconic acid monoalkyl esters such as monomethyl citraconate, monoethyl citraconate, monopropyl citraconate, and mono n-butyl citraconate; citraconic acid monocycloalkyl esters such as monocyclopentyl citraconate, monocyclohexyl citraconate, and monocycloheptyl citraconate; citraconic acid monoalkylcycloalkyl esters such as monomethylcyclopentyl citraconate and monoethylcyclohexyl citraconate; itaconic acid monoalkyl esters such as monomethyl itaconate, monoethyl itaconate, monopropyl itaconate, and mono n-butyl itaconate; itaconic acid monocycloalkyl esters such as monocyclopentyl itaconate, monocyclohexyl itaconate, and monocycloheptyl itaconate; and itaconic acid monoalkylcycloalkyl esters such as monomethylcyclopentyl itaconate and monoethylcyclohexyl itaconate.

Among these compounds, the α,β-ethylenically unsaturated dicarboxylic acid monoester monomer (md1) is preferably monopropyl maleate, mono n-butyl maleate, monopropyl fumarate, mono n-butyl fumarate, monopropyl citraconate, mono n-butyl citraconate, or other monoester of a dicarboxylic acid in which two carbon atoms forming an α,β-ethylenically unsaturated bond have each carboxyl groups, more preferably mono n-butyl maleate, monopropyl citraconate, or other monoester of a dicarboxylic acid having the two carboxyl groups at the cis positions (cis arrangement), and particularly preferably mono n-butyl maleate, from the viewpoint of allowing the advantageous effect of the present invention to become more pronounced.

The percentage of the content of the α,β-ethylenically unsaturated dicarboxylic acid monoester monomer units (d1) in the nitrile group-containing copolymer rubber [A] is preferably 4.5 wt % to 10 wt %, more preferably 6 wt % to 9.5 wt %, and further preferably 6.5 wt % to 8.5 wt % of the total monomer units in the nitrile group-containing copolymer rubber [A]. In a case where the content of the α,β-ethylenically unsaturated dicarboxylic acid monoester monomer units (d1) is not less than 4.5 wt %, an obtained cross-linked rubber will exhibit improvements in mechanical property and compression set resistance. Meanwhile, in a case where the content of the α,β-ethylenically unsaturated dicarboxylic acid monoester monomer units (d1) is not more than 10 wt %, a cross-linkable rubber composition obtained by addition of a cross-linking agent will have good scorch stability, and an obtained cross-linked rubber will exhibit improvement in fatigue resistance.

(Other Monomer Units)

The nitrile group-containing copolymer rubber [A] may contain other monomer units copolymerizable with the α,β-ethylenically unsaturated nitrile monomer (ma1), the conjugated diene monomer (mb1), and the α,β-ethylenically unsaturated dicarboxylic acid monoester monomer (md1).

Examples of a monomer forming the other monomer units include (meth)acrylic acid alkoxyalkyl ester monomer, (meth)acrylic acid alkyl ester monomer, α,β-ethylenically unsaturated monocarboxylic acid monomer, α,β-ethylenically unsaturated polyvalent carboxylic acid monomer, α,βethylenically unsaturated polyvalent carboxylic acid anhydride monomer, aromatic vinyl monomer, fluorine-containing vinyl monomer, and copolymerizable anti-aging agent.

It is preferable that the nitrile group-containing copolymer rubber [A] further contain (meth)acrylic acid alkoxyalkyl ester monomer units (c), in addition to the α,β-ethylenically unsaturated nitrile monomer units (a1), the conjugated diene monomer units (b1), and the α,β-ethylenically unsaturated dicarboxylic acid monoester monomer units (d1). With the nitrile group-containing copolymer rubber [A] further including the (meth)acrylic acid alkoxyalkyl ester monomer units (c), it is possible to obtain a cross-linked rubber that exhibits further improvements in cold resistance and fuel oil resistance and has a more excellent balance of fuel oil resistance and cold resistance.

The (meth)acrylic acid alkoxyalkyl ester monomer (mc) forming the (meth)acrylic acid alkoxyalkyl ester monomer units (c) is not particularly limited as long as it is an ester compound composed of (i) an acrylic acid or a methacrylic acid and (ii) an alcohol having an alkoxyalkyl group. Note that "(meth)acrylic acid" hereinafter means an acrylic acid and/or a methacrylic acid.

Examples of such a (meth)acrylic acid alkoxyalkyl ester monomer (mc) include methoxymethyl (meth)acrylate, methoxyethyl (meth)acrylate, ethoxymethyl (meth)acrylate, ethoxyethyl (meth)acrylate, n-propoxyethyl (meth)acrylate, i-propoxyethyl (meth)acrylate, n-butoxyethyl (meth)acrylate, i-butoxyethyl (meth)acrylate, t-butoxyethyl (meth)acrylate, methoxypropyl (meth)acrylate, and methoxybutyl (meth)acrylate. Among these compounds, the (meth)acrylic acid alkoxyalkyl ester monomer (mc) is preferably a compound containing an alkoxyalkyl group having 2 to 8 carbon atoms, more preferably a compound containing an alkoxyalkyl group having 2 to 6 carbon atoms, further preferably methoxyethyl acrylate and ethoxyethyl acrylate, particularly preferably methoxyethyl acrylate, and especially preferably 2-methoxyethyl acrylate.

The percentage of the content of the (meth)acrylic acid alkoxyalkyl ester monomer units (c) in the nitrile group-containing copolymer rubber [A] is preferably 11 wt % to 30 wt %, more preferably 15 wt % to 25 wt %, and further preferably 20 wt % to 25 wt % of the total monomer units in the nitrile group-containing copolymer rubber [A]. In a case where the content of the (meth)acrylic acid alkoxyalkyl ester monomer units (c) is not less than 11 wt %, an obtained cross-linked rubber will exhibit further improvements in oil resistance and cold resistance. In a case where the content of the (meth)acrylic acid alkoxyalkyl ester monomer units (c) is not more than 30 wt %, an obtained cross-linked rubber will exhibit improvements in fatigue resistance and sliding wear property.

Examples of the (meth)acrylic acid alkyl ester monomer include methyl (meth)acrylate, ethyl (meth)acrylate, n-propyl (meth)acrylate, i-propyl (meth)acrylate, n-butyl (meth)acrylate, i-butyl (meth)acrylate, and t-butyl (meth)acrylate.

Examples of the α,β-ethylenically unsaturated monocarboxylic acid monomer include an acryl acid, a methacrylic acid, and a crotonic acid.

Examples of the α,β-ethylenically unsaturated polyvalent carboxylic acid monomer include an itaconic acid, a fumaric acid, and a maleic acid.

Examples of the α,β-ethylenically unsaturated polyvalent carboxylic acid anhydride monomer include a maleic anhydride.

Examples of the aromatic vinyl monomer include styrene, α-methylstyrene, and vinylpyridine.

Examples of the fluorine-containing vinyl monomer include fluoroethylvinyl ether, fluoropropylvinyl ether, o-trifluoroethylene, vinyl pentafluorobenzoate, difluoroethylene, and tetrafluoroethylene.

The copolymerizable anti-aging agent is exemplified by, for example, N-(4-anilinophenyl)acrylamide, N-(4-anilinophenyl)methacrylamide, N-(4-anilinophenyl)cinnamamide, N-(4-anilinophenyl)crotonamide, N-phenyl-4-(3-vinylbenzyloxy)aniline, and N-phenyl-4-(4-vinylbenzyloxy)aniline.

Two or more of these copolymerizable other monomers may be used in combination. The content of the other monomer units, which are not the α,β-ethylenically unsaturated nitrile monomer units (a1), the conjugated diene monomer units (b1), the (meth)acrylic acid alkoxyalkyl ester monomer units (c), or the α,β-ethylenically unsaturated dicarboxylic acid monoester monomer units (d1), is preferably not more than 50 wt %, more preferably not more than 30 wt %, and further preferably not more than 10 wt % of the total monomer units that constitute the nitrile group-containing copolymer rubber [A].

[Nitrile Group-Containing Copolymer Rubber [B]]

The nitrile group-containing copolymer rubber [B] contained in the cross-linkable rubber composition in accordance with the present invention is a nitrile group-containing copolymer rubber including not less than 30 wt % α,β-ethylenically unsaturated nitrile monomer units (a2) and the conjugated diene monomer units (b2), wherein at least part of the conjugated diene monomer units (b2) may be hydrogenated. Inclusion of the nitrile group-containing copolymer rubber [B] improves fuel oil resistance.

(α,β-Ethylenically Unsaturated Nitrile Monomer Units (a2))

As an α,β-ethylenically unsaturated nitrile monomer (ma2) forming the α,β-ethylenically unsaturated nitrile monomer units (a2), any of the same compounds as those listed above as the α,β-ethylenically unsaturated nitrile monomer (ma1) can be used. As the α,β-ethylenically unsaturated nitrile monomer (ma2), two or more of these compounds may be used in combination. Among these compounds, acrylonitrile and methacrylonitrile are preferable, and acrylonitrile is particularly preferable.

The percentage of the content of the α,β-ethylenically unsaturated nitrile monomer units (a2) in the nitrile group-containing copolymer rubber [B] is not less than 30 wt % and preferably not less than 35 wt % of the total monomer units in the nitrile group-containing copolymer rubber [B]. Further, the percentage of the content of the α,β-ethylenically unsaturated nitrile monomer units (a2) is preferably not more than 90 wt %, more preferably not more than 70 wt %, and further preferably not more than 50 wt %. If the content of the α,β-ethylenically unsaturated nitrile monomer units (a2) is too low, an obtained cross-linked product tends to have decreased fuel oil resistance. If the content of the α,β-ethylenically unsaturated nitrile monomer units (a2) is too high, an obtained cross-linked product tends to have decreased cold resistance.

(Conjugated Diene Monomer Units (b2))

As a conjugated diene monomer (mb2) forming the conjugated diene monomer units (b2), any of the same compounds as those listed above as the conjugated diene monomer (mb1) can be used. As the conjugated diene monomer (mb2), two or more of these compounds may be used in combination. Among these compounds, 1,3-butadiene is preferable.

The percentage of the content of the conjugated diene monomer units (b2) is not more than 70 wt % and preferably not more than 65 wt % of the total monomer units in the nitrile group-containing copolymer rubber [B]. Further, the percentage of the content of the conjugated diene monomer units (b2) is preferably not less than 10 wt %, more preferably not less than 20 wt %, and further preferably not less than 30 wt %. If the content of the conjugated diene monomer units (b2) is too low, a resulting cross-linked rubber tends to have poor rubber elasticity and decreased cold resistance. In a case where the percentage of the content of the conjugated diene monomer units (b2) is not more than 70 wt %, properties of an obtained cross-linked rubber, such as oil resistance, heat aging resistance, and chemical resistant stability, become good.

The nitrile group-containing copolymer rubber [B] is preferably such that at least part of the conjugated diene monomer units (b2) in the nitrile group-containing copolymer rubber [B] is hydrogenated. In that case, the nitrile group-containing copolymer rubber [B] has an iodine value of preferably not more than 120, more preferably not more than 80, further preferably not more than 25, and particularly preferably not more than 10. In a case where the iodine value is not more than 120, an obtained cross-linked rubber will exhibit improvements in heat resistance and ozone resistance.

(Other Monomer Units)

The nitrile group-containing copolymer rubber [B] may contain other monomer units copolymerizable with the α,β-ethylenically unsaturated nitrile monomer (ma2) and the conjugated diene monomer (mb2).

Examples of a monomer forming the other monomer units include α,β-ethylenically unsaturated dicarboxylic acid monoester monomer (md2), (meth)acrylic acid alkoxyalkyl ester monomer (mc), (meth)acrylic acid alkyl ester monomer, α,β-ethylenically unsaturated monocarboxylic acid monomer, α,β-ethylenically unsaturated polyvalent carboxylic acid monomer, α,β-ethylenically unsaturated polyvalent carboxylic acid anhydride monomer, aromatic vinyl monomer, fluorine-containing vinyl monomer, and copolymerizable anti-aging agent.

The nitrile group-containing copolymer rubber [B] preferably contains α,β-ethylenically unsaturated dicarboxylic acid monoester monomer units (d2), from the viewpoint that the nitrile group-containing copolymer rubber [B] is co-cross-linked by the nitrile group-containing copolymer rubber [A] so that a cross-linked rubber exhibits further improvements in mechanical property and compression set resistance.

The percentage of the content of the α,β-ethylenically unsaturated dicarboxylic acid monoester monomer units (d2) is preferably 4.5 to 10 wt %, more preferably 6 to 9.5 wt %, and further preferably 6.5 to 8.5 wt % of the total monomer units in the nitrile group-containing copolymer rubber [B]. In a case where the content of the α,β-ethylenically unsaturated dicarboxylic acid monoester monomer units (d2) is not less than 4.5 wt %, an obtained cross-linked rubber will exhibit improvements in mechanical property and compression set resistance. Meanwhile, in a case where the content of the α,β-ethylenically unsaturated dicarboxylic acid monoester monomer units (d2) is not more than 10 wt %, a cross-linkable rubber composition obtained by addition of a cross-linking agent will have good scorch stability, and an obtained cross-linked rubber will exhibit improvement in fatigue resistance.

As an α,β-ethylenically unsaturated dicarboxylic acid monoester monomer (md2) forming the α,β-ethylenically unsaturated dicarboxylic acid monoester monomer units (d2), any of the same compounds as those listed above as the α,β-ethylenically unsaturated dicarboxylic acid monoester monomer (md1) can be used. As the α,β-ethylenically unsaturated dicarboxylic acid monoester monomer (md2), two or more of these compounds may be used in combination. Among these compounds, the α,β-ethylenically unsaturated dicarboxylic acid monoester monomer (md2) is preferably monopropyl maleate, mono n-butyl maleate, monopropyl fumarate, mono n-butyl fumarate, monopropyl citraconate, mono n-butyl citraconate, or other monoester of a dicarboxylic acid in which two carbon atoms forming an α,β-ethylenically unsaturated bond have each carboxyl groups, more preferably mono n-butyl maleate, monopropyl citraconate, or other monoester of a dicarboxylic acid having the two carboxyl groups at the cis positions (cis arrangement), and particularly preferably mono n-butyl maleate, from the viewpoint of allowing the advantageous effect of the present invention to become more pronounced.

The content of the other monomer units, which are not the α,β-ethylenically unsaturated nitrile monomer units (a2), the conjugated diene monomer units (b2), or the α,β-ethylenically unsaturated dicarboxylic acid monoester monomer units (d2), is preferably not more than 50 wt %, more preferably not more than 30 wt %, and further preferably not more than 10 wt % of the total monomer units that constitute the nitrile group-containing copolymer rubber [B].

Note that the (meth)acrylic acid alkoxyalkyl ester monomer (mc), the (meth)acrylic acid alkyl ester monomer, the α,β-ethylenically unsaturated monocarboxylic acid monomer, the α,β-ethylenically unsaturated polyvalent carboxylic acid monomer, the α,β-ethylenically unsaturated polyvalent carboxylic acid anhydride monomer, the aromatic vinyl monomer, the fluorine-containing vinyl monomer, the copolymerizable anti-aging agent, and others are in conformity with the descriptions in the above section [Nitrile Group-Containing Copolymer Rubber [A]].

[Polymer Mooney Viscosity]

A combination of the nitrile group-containing copolymer rubber [A] and the nitrile group-containing copolymer rubber [B] (which can be hereinafter referred collectively to as "nitrile group-containing copolymer rubber"), which are contained in the cross-linkable rubber composition in accordance with the present invention, has a polymer Mooney viscosity ($ML_{1+4}$, 100° C.) of preferably 15 to 200, more preferably 15 to 150, and further preferably 15 to 100. With use of a nitrile group-containing copolymer rubber having a polymer Mooney viscosity of not less than 15, an obtained rubber cross-linked product will have an excellent mechanical property. Meanwhile, with use of a nitrile group-containing copolymer rubber having a polymer Mooney viscosity of not more than 200, a cross-linkable rubber composition obtained by adding a cross-linking agent to the nitrile group-containing copolymer rubber has good processability.

[Method of Producing Nitrile Group-Containing Copolymer Rubbers]

A method of producing the nitrile group-containing copolymer rubbers [A] and [B] contained in the cross-linkable rubber composition in accordance with the present invention is not particularly limited. Each of the rubbers can be produced in the following manner. After copolymerization of the above-described monomers is performed by emulsion polymerization using an emulsifier, unreacted monomers are removed if desired to prepare a latex of a nitrile group-containing copolymer rubber. The latex is hydrogenated as necessary, and then solidified and dried to obtain an intended solid rubber. At the time of emulsion polymerization, an emulsifier, a polymerization initiator, a molecular weight adjuster, or other usually used secondary polymerization material can be used.

Non-limiting examples of the emulsifier encompass nonionic emulsifiers including polyoxyethylene alkyl ether, polyoxyethylene alkyl phenol ether, polyoxyethylene alkyl ester, and polyoxyethylene sorbitan alkyl ester; anionic emulsifiers including (i) salts of fatty acids such as a myristic acid, a palmitic acid, an oleic acid, and a linolenic acid, (ii) alkylbenzene sulfonate such as sodium dodecylbenzene sulfonate, (iii) higher alcohol sulfates, and (iv) alkyl sulfosuccinates; and copolymerizable emulsifiers including sulfoester of α,β-unsaturated carboxylic acid, sulfate ester of α,β-unsaturated carboxylic acid, and sulfoalkyl arylether. The amount of the emulsifier used is preferably 0.1 to 10 parts by weight, with respect to 100 parts by weight of the total monomers to be subjected to polymerization.

The polymerization initiator is not particularly limited as long as it is a radical initiator. Examples of the polymerization initiator include inorganic peroxides such as potassium persulfate, sodium persulfate, ammonium persulfate, potassium perphosphate, and hydrogen peroxide; organic peroxides such as t-butyl peroxide, cumen hydroperoxide, p-mentane hydroperoxide, di-t-butyl peroxide, t-butylcumyl peroxide, acetyl peroxide, isobutyryl peroxide, octanoyl peroxide, dibenzoyl peroxide, 3,5,5-trimethylhexanoyl peroxide, and t-butyl peroxyisobutyrate; and azo compounds such as azobisisobutyronitrile, azobis-2,4-dimethyl valeronitrile, azobiscyclohexane carbonitrile, and methyl azobisisobutyrate. These polymerization initiators can be used alone or in combination of two or more thereof.

Among the exemplified polymerization initiators, an inorganic peroxide or an organic peroxide is preferable. The peroxide, when used as the polymerization initiator, may be combined with a reducing agent such as sodium bisulfite and ferrous sulfate, for use as a redox-based polymerization initiator. The amount of the polymerization initiator used is preferably 0.01 to 2 parts by weight with respect to 100 parts by weight of the total monomers to be subjected to polymerization.

The molecular weight adjuster is not particularly limited. Examples of the molecular weight adjuster include mercaptans such as t-dodecyl mercaptan, n-dodecyl mercaptan, and octyl mercaptan; halogenated hydrocarbons such as carbon tetrachloride, methylene chloride, and methylene bromide; a-methylstyrene dimer; and sulfur-containing compounds such as tetraethylthiuram disulfide, dipentamethylene thiuram disulfide, and diisopropyl xantogen disulfide. These compounds may be used alone or in combination of two or more thereof. Among these compounds, mercaptans are preferable, and t-dodecyl mercaptan is more preferable. The amount of the molecular weight adjuster used is preferably 0.1 to 0.8 part by weight with respect to 100 parts by weight' of the total monomers to be subjected to polymerization.

For example, water can be used as a medium of the emulsion polymerization. The amount of water is preferably 80 to 500 parts by weight with respect to 100 parts by weight of the total monomers to be subjected to polymerization.

In performing the emulsion polymerization, a secondary polymerization material(s) such as a stabilizer, a dispersant, a pH adjuster, a deoxidizer, and a particle size adjuster can be further used if necessary. A type(s) and amount(s) of such a secondary polymerization material(s), if used, are not particularly limited.

Further, by selectively hydrogenating double bonds of the conjugated diene monomer units (b1) of an obtained copolymer, it is possible to produce the nitrile group-containing copolymer rubber [A]. In a case where the nitrile group-containing copolymer rubber [B] is to be used in which at least part of the conjugated diene monomer units (b2) is hydrogenated, it is possible to produce such a nitrile group-containing copolymer rubber [B] by selectively hydrogenating double bonds of the conjugated diene monomer units (b2). Note that the type and amount of a hydrogenation catalyst used for the hydrogenation, a hydrogenation temperature, and other conditions are determined in accordance with a known method.

Methods of the hydrogenation include hydrogenation performed on a latex and hydrogenation performed on a solid rubber solution that is obtained by dissolving, in an organic solvent, a solid rubber, which has been obtained by solidifying and drying the latex. In the former case, it is possible to obtain an intended solid rubber by subjecting the latex to the hydrogenation reaction and then solidifying and drying the latex thus obtained. In the latter case, it is possible to obtain an intended solid rubber by removing the organic solvent, by steam stripping or the like, from the solution having been subjected to hydrogenation reaction, and then drying a residue.

[Mixture Ratio of Nitrile Group-Containing Copolymer Rubbers [A] and [B]]

A mixture ratio (weight ratio) of the nitrile group-containing copolymer rubbers [A] and [B] ([A]/[B]) in the cross-linkable rubber composition in accordance with the present invention is preferably 20/80 to 80/20, more preferably 25/75 to 75/25, and further preferably 40/60 to 60/40. In a case where the mixture ratio of the nitrile group-containing copolymer rubber [A] is not less than 20 with respect to 100, which is a sum of the amount of the nitrile group-containing copolymer rubber [A] and the amount of the nitrile group-containing copolymer rubber [B], a sufficient degree of cold resistance will be exhibited. In a case where the mixture ratio of the nitrile group-containing copolymer rubber [B] is not less than 20 with respect to 100, which is a sum of the amount of the nitrile group-containing copolymer rubber [A] and the amount of the nitrile group-containing copolymer rubber [B], a sufficient degree of oil resistance will be exhibited.

[Amine-based Cross-linking Agent]

The cross-linkable rubber composition in accordance with the present invention contains the amine-based cross-linking agent. This improves compression set resistance and allows excellent cold resistance to be imparted to an obtained cross-linked rubber.

As specific examples of the amine-based cross-linking agent, the amine-based cross-linking agent is not particularly limited as long as it is a compound having two or more amino groups or is any material that turns into the compound having two or more amino groups during cross-linking. More specifically, the amine-based cross-linking agent is preferably (i) a compound having an aliphatic hydrocarbon or aromatic hydrocarbon with a plurality of hydrogen atoms substituted by amino groups or by hydrazide structures (structures expressed by —CONHNH$_2$, where CO indicates a carbonyl group) and (ii) any material that turns into the (i) compound during cross-linking. Specific examples of the amine-based cross-linking agent include aliphatic polyvalent amines such as hexamethylene diamine, hexamethylene diamine carbamate, tetramethylene pentamine, hexamethylene diamine cinnamaldehyde adduct, and hexamethylene diamine dibenzoate salt; aromatic polyvalent amines such as 2,2 -bis{4-(4-aminophenoxy)phenyl}propane, 4,4'-methylene dianiline, m-phenylene diamine, p-phenylene diamine, and 4,4'-methylene bis(o-chloroaniline); and compounds each having two or more hydrazide structures, such as dihydrazide isophthalate, dihydrazide adipate, and dihydrazide sebacate. Among these compounds, aliphatic polyvalent amines are preferable, and hexamethylene diamine carbamate is particularly preferable.

The amount of the amine-based cross-linking agent to be mixed in the cross-linkable rubber composition in accordance with the present invention is preferably 0.1 part by weight to 20 parts by weight, more preferably 0.2 part by weight to 15 parts by weight, further preferably 0.5 part by weight to 10 parts by weight, particularly preferably 1 part by weight to 5 parts by weight, and most preferably 1.5 part by weight to 4 parts by weight, with respect to a total amount of 100 parts by weight of the combination of the nitrile group-containing copolymer rubbers [A] and [B]. In a case where the amount of the amine-based cross-linking agent is not less than 0.1 part by weight, an obtained cross-linked rubber will exhibit further improvements in mechanical property and compression set resistance. Meanwhile, in a case where the amount of the amine-based cross-linking agent is not more than 20 parts by weight, an obtained cross-linked rubber will have good fatigue resistance.

[Basic Cross-linking Accelerator]

It is preferable that the cross-linkable rubber composition in accordance with the present invention further contain a basic cross-linking accelerator, in addition to the nitrile group-containing copolymer rubbers [A] and [B] and the amine-based cross-linking agent. A cross-linkable rubber composition further containing the basic cross-linking accelerator will exhibit the advantageous effect of the present invention more pronouncedly.

Specific examples of the basic cross-linking accelerator include basic cross-linking accelerators having cyclic amidine structures such as 1,8-diazabicyclo[5,4,0]undecene-7 (which can be hereinafter abbreviated as "DBU") and 1,5-diazabicyclo[4,3,0]nonene-5 (which can be hereinafter abbreviated as "DBN"), 1-methylimidazole, 1-ethylimidazole, 1-phenylimidazole, 1-benzylimidazole, 1,2-dimethylimidazole, 1-ethyl-2-methylimidazole, 1-methoxyethylimidazole, 1-phenyl-2-methylimidazole, 1-benzyl-2-methylimidazole, 1-methyl-2-phenylimidazole, 1-methyl-2-benzylimidazole, 1,4-dimethylimidazole, 1,5-dimethylimidazole, 1,2,4-trimethylimidazole, 1,4-dimethyl-2-ethylimidazole, 1-methyl-2-methoxyimidazole, 1-methyl-2-ethoxyimidazole, 1-methyl-4-methoxyimidazole, 1-methyl-2-methoxyimidazole, 1-ethoxymethyl-2-methyl imidazole, 1-methyl-4-nitroimidazole, 1,2-dimethyl-5-nitroimidazole, 1,2-dimethyl-5-aminoimidazole, 1-methyl-4-(2-aminoethyl)imidazole, 1-methylbenzoimidazole, 1-methyl-2-benzylbenzoimidazole, 1-methyl-5-nitrobenzoimidazole, 1-methylimidazoline, 1,2-dimethylimidazoline, 1,2,4-trimethylimidazoline, 1,4-dimethyl-2-ethylimidazoline, 1-methyl-phenylimidazoline, 1-methyl-2-benzylimidazoline, 1-methyl-2-ethoxyimidazoline, 1-methyl-2-heptylimidazoline, 1-methyl-2-undecylimidazoline, 1-methyl-2-heptadecylimidazoline, 1-methyl-2-ethoxymethylimidazoline, and 1-ethoxymethyl-2-methylimidazoline; guanidine-based basic cross-linking accelerators such as tetramethylguanidine, tetraethylguanidine, diphenylguanidine, 1,3-di-o-tolylguanidine, and o-tolylbiguanide; and aldehydeamine-based basic cross-linking accelerators such as n-butylaldehyde aniline and acetoaldehyde ammonia.

Among these basic cross-linking accelerators, the guanidine-based cross-linking accelerators and the basic cross-linking accelerators having cyclic amidine structures are preferable, 1,3-di-o-tolylguanidine, 1,8-diazabicyclo[5,4,0]undecene-7, and 1,5-diazabicyclo[4,3,0]nonene-5 are further preferable, and 1,8-diazabicyclo[5,4,0]undecene-7 is particularly preferable. Note that the basic cross-linking accelerators having cyclic amidine structures may form salts with, for example, organic carboxylic acids and alkylphosphoric acids.

The amount of the basic cross-linking accelerator to be mixed in the cross-linkable rubber composition in accordance with the present invention is 0.1 part by weight to 20 parts by weight, more preferably 0.5 part by weight to 10 parts by weight, and further preferably 1 part by weight to 5 parts by weight, with respect to a total amount of 100 parts by weight of the combination of the nitrile group-containing copolymer rubbers [A] and [B]. In a case where the amount of the basic cross-linking accelerator is not less than 0.1 part by weight, a cross-linkable rubber composition will have an adequate cross-linking rate and good cross-linking density. Meanwhile, in a case where the amount of the basic cross-linking accelerator is not more than 20 parts by weight, a cross-linking rate of a cross-linkable rubber composition is prevented from getting too fast, resulting in preventing the occurrence of scorching. Besides, good storage stability is achieved.

[Other Compounding Agents]

The cross-linkable rubber composition in accordance with the present invention may further contain a compounding agent that can be used in the rubber field, in addition to the nitrile group-containing copolymer rubbers [A] and [B], the amine-based cross-linking agent, and the optionally added basic cross-linking accelerator. Examples of such a compounding agent to be mixed include reinforcing fillers such as carbon black and silica; nonreinforcing fillers calcium carbonate and clay; cross-linking accelerators other than the basic cross-linking accelerators; cross-linking aids; cross-linking retarders; anti-aging agents; antioxidants; photostabilizers; scorch preventers such as primary amine; plasticizers; processing aids; slip agents; tackifiers; lubrication agents; flame retardants; antifungal agents; acid acceptors; antistatic agents; and pigments. The amounts of these compounding agents are not particularly limited as long as they are mixed in a range that would not impair the object and advantageous effects of the present invention. The compounding agents can be mixed in any amounts according to purposes for mixing the compounding agents.

In the cross-linkable rubber composition in accordance with the present invention, another rubber that is not the nitrile group-containing copolymer rubber [A] or [B] may be mixed in a range that would not impair the advantageous effects of the present invention. The amount of the other rubber optionally mixed in the cross-linkable rubber composition is preferably not more than 30 parts by weight, more preferably not more than 20 parts by weight, and further preferably not more than 10 parts by weight, with respect to a total amount of 100 parts by weight of the combination of the nitrile group-containing copolymer rubbers [A] and [B].

[Preparation Method]

The cross-linkable rubber composition in accordance with the present invention is prepared by mixing the foregoing ingredients in a nonaqueous system.

A method of preparing the cross-linkable rubber composition in accordance with the present invention is not limited. For example, the cross-linkable rubber composition in accordance with the present invention can be prepared by the following method. The ingredients, except for the cross-linking agent and the thermally unstable cross-linking aid, etc., are primarily kneaded by a Bambury mixer, an internal mixer, a kneader, or other mixer. Thereafter, the ingredients are transferred to a roll kneading machine or other machine and then mixed with the cross-linking agent and the thermally unstable cross-linking aid, etc. The mixture is secondarily kneaded to obtain the cross-linkable rubber composition in accordance with the present invention.

The thus obtained cross-linkable rubber composition in accordance with the present invention has a compound Mooney viscosity [$ML_{1+4}$, 100° C.] that can be adjusted suitably to 15 to 200, more preferably 20 to 175, and further preferably 25 to 150. The cross-linkable rubber composition in accordance with the present invention having such a compound Mooney viscosity is excellent in workability.

<Cross-linked Rubber>

A cross-linked rubber in accordance with the present invention contains: a nitrile group-containing copolymer rubber [A] including less than 30 wt % $\alpha,\beta$-ethylenically unsaturated nitrile monomer units (a1), conjugated diene monomer units (b1), and $\alpha,\beta$-ethylenically unsaturated dicarboxylic acid monoester monomer units (d1), wherein at least part of the conjugated diene monomer units (b1) is hydrogenated; and a nitrile group-containing copolymer rubber [B] including not less than 30 wt % $\alpha,\beta$-ethylenically unsaturated nitrile monomer units (a2) and conjugated diene monomer units (b2), wherein at least part of the conjugated diene monomer units (b2) may be hydrogenated, the nitrile group-containing copolymer rubber [A] and the nitrile group-containing copolymer rubber [B] being cross-linked with an amine-based cross-linking agent.

The cross-linked rubber in accordance with the present invention is suitably obtained from the cross-linkable rubber composition in accordance with the present invention. The cross-linked rubber in accordance with the present invention is therefore excellent in both fuel oil resistance and cold resistance. Further, the present invention encompasses a method for producing a cross-linked rubber, including: mixing a nitrile group-containing copolymer rubber [A], a nitrile group-containing copolymer rubber [B], and an amine-based cross-linking agent, thereby cross-linking the nitrile group-containing copolymer rubber [A] and the nitrile group-containing copolymer rubber [B] with the amine-based cross-linking agent, the nitrile group-containing copolymer rubber [A] including less than 30 wt % $\alpha,\beta$-ethylenically unsaturated nitrile monomer units (a1), conjugated diene monomer units (b1), and $\alpha,\beta$-ethylenically unsaturated dicarboxylic acid monoester monomer units (d1), wherein at least part of the conjugated diene monomer units (b1) is hydrogenated, the nitrile group-containing copolymer rubber [B] including not less than 30 wt % $\alpha,\beta$-ethylenically unsaturated nitrile monomer units (a2) and conjugated diene monomer units (b2), wherein at least part of the conjugated diene monomer units (b2) may be hydrogenated.

A more specific example method for producing the cross-linked rubber in accordance with the present invention is as follows. That is, the cross-linked rubber in accordance with the present invention can be produced, for example, by molding the cross-linkable rubber composition in accordance with the present invention by a molding machine designed for a desired shape, heating the cross-linkable rubber composition so that a cross-linking reaction occurs, and then fixing the shape of the cross-linkable rubber composition to obtain a cross-linked product. The molding machine is, for example, an extruder, an injection molding machine, a compressor, rolls, etc. In such a method, molding may be performed in advance before cross-linking. Alternatively, molding and cross-linking may be performed simultaneously. A molding temperature is preferably 10° C. to 200° C. and more preferably 25° C. to 120° C. A cross-linking temperature is preferably 100° C. to 200° C. and more preferably 130° C. to 190° C. A cross-linking time is preferably 1 minute to 24 hours and more preferably 2 minutes to 6 hours.

There may be a case where, depending on the shape, size, etc. of an intended cross-linked rubber, an internal part of a cross-linkable rubber composition is insufficiently cross-linked even when a surface of the cross-linkable rubber composition is cross-linked. Just in case, the cross-linkable rubber composition may be further heated for its secondary cross-linking.

As a heating method, a method usually used for cross-linking of rubber, such as press heating, steam heating, oven heating, or hot air heating, may be selected as appropriate.

The thus obtained cross-linked rubber in accordance with the present invention is excellent in both fuel oil resistance and cold resistance and has an excellent balance of fuel oil resistance and cold resistance. Further, the cross-linked rubber in accordance with the present invention has good normal physical properties and is especially excellent in compression set resistance.

As such, the cross-linked rubber in accordance with the present invention can be used for various types of seal materials such as O-rings, packings, diaphragms, oil seals, shaft seals, bearing seals, well head seals, air compressor seals, seals for sealing chlorofluorocabon or fluorohydrocarbons or carbon dioxide used for cooling apparatuses of air-conditioners or compressors for cooling machines for air-conditioning systems, seals for sealing supercritical carbon dioxide or subcritical carbon dioxide used for washing media for precision cleaning, seals for roller devices (e.g., a roller bearing, an automotive hub unit, an automotive water pump, a linear guide device, and a ball screw), valves and valve seats, blowout preventers (BOP), and platters; various types of gaskets such as an intake manifold gasket attached at a connecting part between an intake manifold and a cylinder head, a cylinder head gasket attached at connecting part between a cylinder block and a cylinder head, a rocker cover gasket attached at connecting part between a rocker cover and a cylinder head, an oil pan gasket attached at a connecting part between an oil pan and a cylinder block or a transmission case, a fuel cell separator gasket attached in between a pair of housings sandwiching a unit cell provided with an anode, electrolyte plates, and cathode, and a top cover gasket of a hard disk drive; various types of rolls such as printing rolls, ironmaking rolls, papermaking rolls, industrial-use rolls, and office machinery rolls; various types of belts such as flat belts (e.g., a film core flat belt, a cord flat belt, a laminated type flat belt, and a single unit type flat belt), V-belts (e.g., a lapped V-belt and a low edge V-belt), V-ribbed belts (e.g., a single V-ribbed belt, a double V-ribbed belt, a lapped V-ribbed belt, a back surface rubber V-ribbed belt, and a top cog V-ribbed belt), CVT belts, timing belts, toothed belts, and conveyor belts; various types of hoses such as fuel hoses, turbo air hoses, oil hoses, radiator hoses, heater hoses, water hoses, vacuum brake hoses, control hoses, air-conditioner hoses, brake hoses, power steering hoses, air hoses, marine hoses, risers, and flowlines; various types of boots such as CVJ boots, propeller shaft boots, constant velocity joint boots, and rack and pinion boots; damping material rubber parts such as cushion materials, dynamic dampers, rubber couplings, air springs, and vibration isolators; dust covers; car interior members; tires; covered cables; shoe soles; electromagnetic wave shields; flexible printed circuit board binders and other binders; fuel cell separators; and other wide range of applications in the fields of cosmetics and pharmaceuticals, food-contacting fields, and electronics field, and other fields. Above all, the cross-linked rubber in accordance with the present invention can be used suitably for belts, hoses, or seal materials and particularly suitably for seal materials. The cross-linked rubber in accordance with the present invention is used suitably for an O-ring among the seal materials.

The present invention is not limited to the embodiments described above, but can be altered in various ways within the scope of the appended claims. An embodiment derived from a proper combination of technical means disclosed in different embodiments is also encompassed in the technical scope of the present invention.

EXAMPLES

The following description will discuss the embodiments of the present invention in more detail with reference to Examples. The present invention is, however, not limited to Examples described below. Note that "part" mentioned in Examples below are based on weight unless specifically stated otherwise.

[Composition of Nitrile Group-containing Copolymer Rubber]

The percentages of contents of individual monomer units constituting the nitrile group-containing copolymer rubber were determined by $^1$H-NMR analysis and $^{13}$C-NMR analysis. Note that 1,3-butadiene units indicated in Table 1 contain structural units obtained by hydrogenation of carbon-carbon double bonds in the 1,3-butadiene units.

[Iodine Value]

The iodine value of the nitrile group-containing copolymer rubber was measured in accordance with JIS K 6235.

[Mooney Viscosity (Polymer Mooney)]

The Mooney viscosity of the nitrile group-containing copolymer rubber was measured in accordance with JIS K 6300-1 (unit: [$ML_{1+4}$, 100° C.]).

[Fuel Oil Immersion Test]

Each cross-linked rubber was punched into a test piece having a size of 30 mm×20 mm×2 mm. The test piece thus obtained was immersed at 40° C. for 168 hours in fuel oil (Fuel-C), which is a mixture of toluene and isooctane in a ratio of 50:50 by volume, to conduct a fuel oil immersion test. Then, post-immersion volume swelling $\Delta V$ (unit: %) was calculated in accordance with JIS K 6258. The smaller the post-immersion volume swelling $\Delta V$, the more excellent in fuel oil resistance.

[Cold Resistance Test]

The cold resistance of each cross-linked rubber was measured in accordance with JIS K 6261 by a TR test (low temperature elasticity recovery test). The lower a value of TR10(unit:° C.), the more excellent in cold resistance.

Plots of $\Delta V$ and TR10 obtained by the above two tests are placed on a graph (where an X-axis indicates $\Delta V$, and an Y-axis indicates TR10). In the graph, a plot closer to the lower left part of the graph indicates a material having a good balance of fuel oil resistance and cold resistance.

Synthesis Example 1

One hundred and eighty parts of ion exchanged water, 25 parts of sodium dodecylbenzene sulfonate aqueous solution with a 10 wt % concentration, 23 parts of acrylonitrile (ma 1), 7 parts of mono n-butyl maleate (md1), 30 parts of 2-methoxyethyl acrylate (mc), and 0.5 part of t-dodecylmercaptan (molecular weight adjuster) are placed in a metal bottle in this order. An internal gas in the metal bottle was then replaced with nitrogen three times. Subsequently, 40 parts of 1,3-butadiene (mb1) was placed in the metal bottle. While the metal bottle was held at 5° C., 0.1 part of cumen hydroperoxide (polymerization initiator) was placed in the metal bottle. The mixture was then allowed to make polymerization reaction for 16 hours while the metal bottle was kept being rotated.

Subsequently, 0.1 part of hydroquinone aqueous solution (polymerization terminator) with a 10 wt % concentration was added to the mixture to terminate the polymerization reaction. Thereafter, a rotary evaporator of 60° C. in water temperature was used to remove an unreacted monomer. In this way, a latex of a nitrile group-containing copolymer rubber (solid content concentration of approximately 30 wt %) was obtained.

Next, the latex thus obtained and a palladium catalyst (solution of mixture of 1 wt % palladium acetate acetone solution and an equal weight of ion exchanged water) were added into an autoclave so that the palladium content was 1,000 ppm with respect to the dry weight of the rubber contained in the latex, and were subjected to a hydrogenation reaction at a hydrogen pressure of 3 MPa and a temperature of 50° C. for 6 hours to obtain a latex of the nitrile group-containing copolymer rubber.

To the obtained latex of the nitrile group-containing copolymer rubber, methanol whose volume is twice higher than that of the latex was added to solidify the latex. Thereafter, filtration was performed to extract a solid (crumb). The solid (crumb) was dried in vacuum at 60° C. for 12 hours to obtain the nitrile group-containing copolymer rubber [A]. The nitrile group-containing copolymer rubber [A] thus obtained had an iodine value of 7 and a polymer Mooney viscosity [$ML_{1+4}$, 100° C.] of 50. The percentages of contents of monomer units constituting the nitrile group-containing copolymer rubber [A] thus obtained are shown in Table 1.

Synthesis Examples 2 and 3

Nitrile group-containing copolymer rubbers [B1] and [B2] were obtained as in Synthesis Example 1 except that the amounts of acrylonitrile (ma2), mono n-butyl maleate (md2), 2-methoxyethyl acrylate (mc), and 1,3-butadiene (mb2) to be used were changed to the amounts shown in Table 1.

The percentages of contents of monomer units constituting each of the nitrile group-containing copolymer rubbers thus obtained, iodine values thereof, and polymer Mooney viscosities thereof are shown in Table 1.

TABLE 1

|  | Synthesis Examples | | |
|---|---|---|---|
|  | 1 [A] | 2 [B1] | 3 [B2] |
| Amounts of monomers used | | | |
| Acrylonitrile (ma1) or (ma2) [part] | 23 | 35 | 43 |
| 1,3-butadiene (mb1) or (mb2) [part] | 40 | 59 | 57 |
| Methoxyethyl acrylate (mc) [part] | 30 | 0 | 0 |
| Mono n-butyl maleate (md1) or (md2) [part] | 7 | 6 | 0 |

TABLE 1-continued

|  | Synthesis Examples | | |
|---|---|---|---|
|  | 1 [A] | 2 [B1] | 3 [B2] |
| Nitrile group-containing copolymer rubber | | | |
| Acrylonitrile units (a1) or (a2) [wt %] | 24 | 36 | 44 |
| 1,3-butadiene units (b1) or (b2) [wt %] | 46 | 58 | 56 |
| 2-methoxyethyl acrylate units (c) [wt %] | 23 | 0 | 0 |
| Mono n-butyl maleate units (d) [wt %] | 7 | 6 | 0 |
| Iodine value | 7 | 10 | 7 |
| Polymer Mooney viscosity ($ML_{1+4}$ 100° C.) | 50 | 45 | 45 |

Example 1

Method of Preparation of Rubber Blend Sample Made of [A] and [B1] and Evaluation Results A cross-linkable rubber composition was prepared, in accordance with the amounts of ingredients to be mixed shown in Table 2, by using a Bambury mixer and then using a roll kneading machine. Firstly, to the nitrile group-containing copolymer rubber [A] obtained in Synthesis Example 1 and the nitrile group-containing copolymer rubber [B1] obtained in Synthesis Example 2, FEF carbon (product name "Seast SO", manufactured by Tokai Carbon, carbon black), tri-2-ethylhexyl trimellitate (product name "ADK Cizer C-8", manufactured by ADEKA Corporation, plasticizer), 4,4'-di-(α,α'-dimethylbenzyl)diphenylamine (product name "Noclac CD", manufactured by Ouchi Shinko Chemical Industrial Co., Ltd., anti-aging agent), stearic acid, and polyoxyethylene stearylether phosphate (product name "Phosphanol RL210", manufactured by Toho Chemical Industry Co., Ltd., processing aid) were added and kneaded by using the Bambury mixer. Subsequently, the kneaded mixture was transferred to a roll kneading machine, and hexamethylene diamine carbamate (product name "Diak#1", manufactured by DuPont Dow Elastomer LLC, polyamine-based cross-linking agent) and 1,3-di-o-tolyl-guanidine (product name "Noccelar DT", manufactured by Ouchi Shinko Chemical Industrial Co., Ltd., cross-linking accelerator) were further added thereto and kneaded to obtain a cross-linkable rubber composition.

Then, the cross-linkable rubber composition was placed in a mold of 15 cm in length, 15 cm in width, and 0.2 cm in depth, and then subjected to press forming at 170° C. for 20 minutes by application of a press pressure of 10 MPa to obtain a cross-linked product in a sheet form. Subsequently, the cross-linked product thus obtained was transferred to a gear type oven and secondarily cross-linked at 170° C. for 4 hours. The cold resistance test and the fuel oil immersion test (toluene/isooctane of 50/50) were conducted on the cross-linked rubber thus obtained to perform evaluations on the cross-linked rubber. The results are shown in Table 2.

Example 2

Method of Preparation of Rubber Blend Sample Made of [A] and [B2] and evaluation results A cross-linked rubber was obtained as in Example 1 except that the nitrile group-containing copolymer rubber [B1] was replaced by the nitrile group-containing copolymer rubber [B2]. Ingredients to be mixed and evaluation results are shown in Table 2.

Comparative Example 1

Method of Preparation of Rubber Blend Sample Made of [B1] and [B2] and Evaluation Results A cross-linked rubber was obtained as in Example 1 except that the nitrile group-containing copolymer rubber [A] was replaced by the nitrile group-containing copolymer rubber [B2]. Ingredients to be mixed and evaluation results are shown in Table 2.

Comparative Example 2

Method of Preparation of Rubber Sample Made Only of [A] and evaluation results A cross-linked rubber was obtained as in Example 1 except that the cross-linked rubber was a rubber sample was made only of the nitrile group-containing copolymer rubber [A]. Ingredients to be mixed and evaluation results are shown in Table 2.

Comparative Example 3

Method of Preparation of Rubber Sample Made Only of [B1] and Evaluation Results A cross-linked rubber was obtained as in Example 1 except that the cross-linked rubber was a rubber sample was made only of the nitrile group-containing copolymer rubber [B1]. Ingredients to be mixed and evaluation results are shown in Table 2.

Comparative Example 4

Method of Preparation of Rubber Sample Made Only of [B2] and Evaluation Results A cross-linked rubber was obtained as in Example 1 except that the cross-linked rubber was a rubber sample was made only of the nitrile group-containing copolymer rubber [B2]. Ingredients to be mixed and evaluation results are shown in Table 2.

Figure 1:
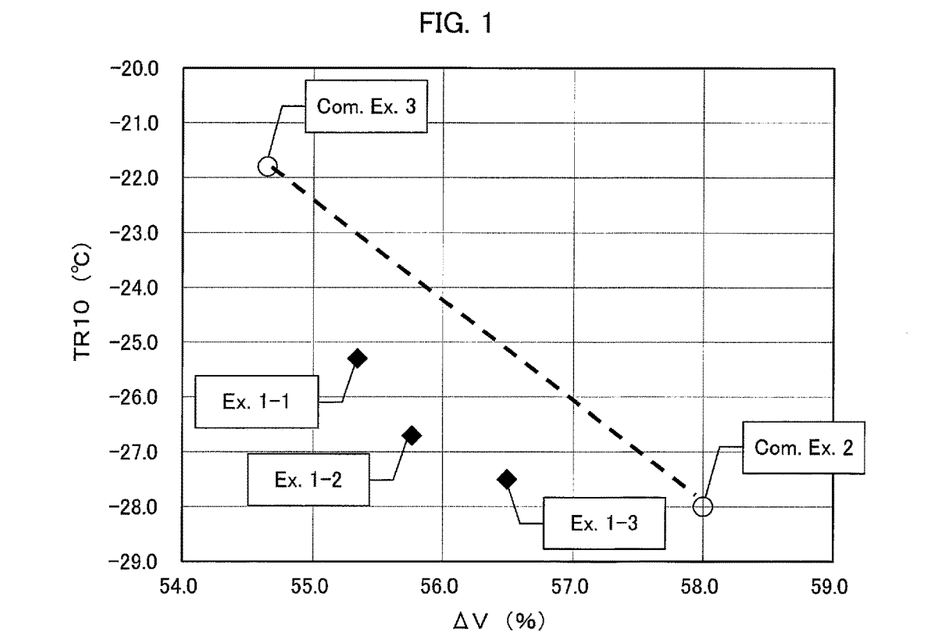
FIG. 1 is a graph showing results of measurements of fuel oil resistance and cold resistance in Examples in accordance with the present invention.
Figure 2:
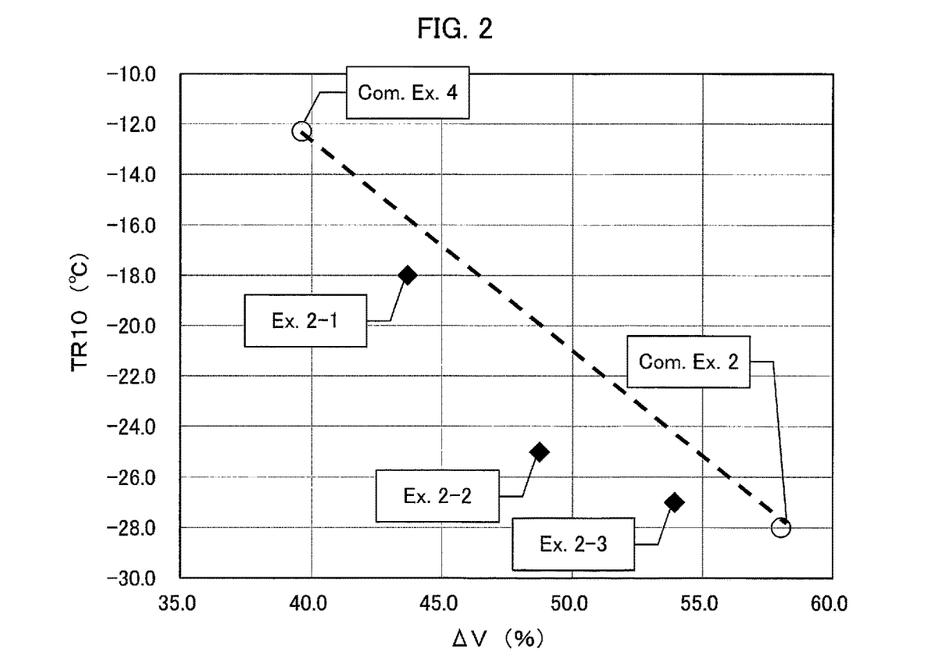
FIG. 2 is a graph showing results of measurements of fuel oil resistance and cold resistance in Examples in accordance with the present invention.
Figure 3:
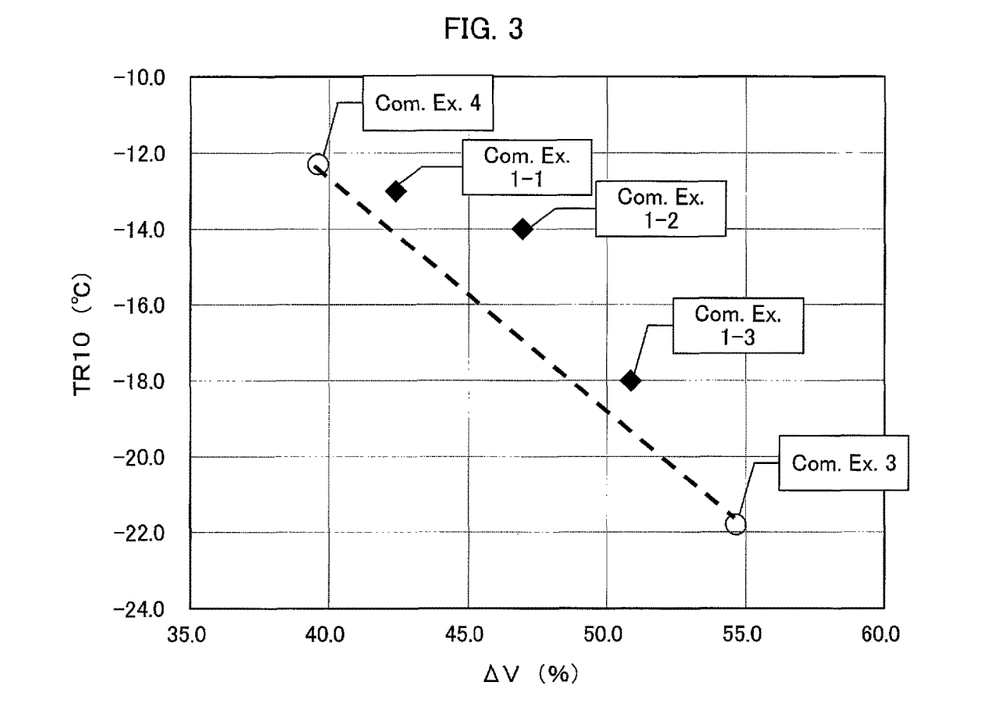
FIG. 3 is a graph showing results of measurements of fuel oil resistance and cold resistance in Comparative Examples in accordance with the present invention.

Based on numerical values in Table 2, plots of $\Delta V$ and TR10 are placed on graphs (where X-axes indicate $\Delta V$, and Y-axes indicate TR 10) shown in FIGS. 1 to 3. FIGS. 1 to 3 are graphs showing results of measurements of cold resistance and fuel oil resistance in Examples and Comparative Examples in accordance with the present invention.

From FIG. 1, it is apparent that plots for the rubber blends in Examples 1-1 to 1-3 are closer to the lower left part of the graph than plots for the single rubbers in Comparative Examples 2 and 3. This demonstrates that blending rubbers leads to improvements in both fuel oil resistance and cold resistance.

In FIG. 2, similarly to FIG. 1, the plots for the rubber blends in Examples 2-1 to 2-3 are closer to the lower left part of the graph than plots for the single rubbers in Comparative Examples 2 and 4. This demonstrates improvements in fuel oil resistance and cold resistance.

On the other hand, as shown in FIG. 3, plots for the rubber blends in Comparative Example 1 are far from the lower left part of the graph. This demonstrates deteriorations in fuel oil resistance and cold resistance.

TABLE 2

| | Example 1 [A]/[B1] blend | | | Example 2 [A]/[B2] blend | | | Com. Ex. 1 [B1]/[B2] blend | | | Com. Ex. 2 [A] | Com. Ex. 3 [B1] | Com. Ex. 4 [B2] |
|---|---|---|---|---|---|---|---|---|---|---|---|---|
| | Ex. 1-1 | Ex. 1-2 | Ex. 1-3 | Ex. 2-1 | Ex. 2-2 | Ex. 2-3 | Com. Ex. 1-1 | Com. Ex. 1-2 | Com. Ex. 1-3 | Com. Ex. 2 | Com. Ex. 3 | Com. Ex. 4 |
| [A] | 25 | 50 | 75 | 25 | 50 | 75 | | | | 100 | | |
| [B1] | 75 | 50 | 25 | | | | 25 | 50 | 75 | | 100 | |
| [B2] | | | | 75 | 50 | 25 | 75 | 50 | 25 | | | 100 |
| Seast SO | 45 | 45 | 45 | 45 | 45 | 45 | 45 | 45 | 45 | 45 | 45 | 45 |
| ADK Cizer C-8 | 5 | 5 | 5 | 5 | 5 | 5 | 5 | 5 | 5 | 5 | 5 | 5 |
| Noclac CD | 1.5 | 1.5 | 1.5 | 1.5 | 1.5 | 1.5 | 1.5 | 1.5 | 1.5 | 1.5 | 1.5 | 1.5 |
| Stearic acid | 1 | 1 | 1 | 1 | 1 | 1 | 1 | 1 | 1 | 1 | 1 | 1 |
| Phosphanol RL210 | 1 | 1 | 1 | 1 | 1 | 1 | 1 | 1 | 1 | 1 | 1 | 1 |
| Diak#1 | 2.5 | 2.6 | 2.6 | 2.2 | 2.4 | 2.5 | 2.1 | 2.2 | 2.3 | 2.7 | 2.4 | 2 |
| Noccelar DT | 4 | 4 | 4 | 4 | 4 | 4 | 4 | 4 | 4 | 4 | 4 | 4 |
| Immersion test (Fuel-C, 40° C. 168 hours) $\Delta V$ (%) | 55.3 | 55.8 | 56.5 | 43.7 | 48.7 | 53.9 | 42.4 | 47.0 | 50.9 | 58.0 | 54.6 | 39.6 |
| TR test T10 (° C.) | −25.3 | −26.7 | −27.5 | −18.0 | −25.0 | −27.0 | −13.0 | −14.0 | −18.0 | −28.0 | −21.8 | −12.3 |

INDUSTRIAL APPLICABILITY

The present invention is applicable to various rubber products.

The invention claimed is:

1. A cross-linkable rubber composition comprising:
a nitrile group-containing copolymer rubber [A] including less than 30 wt % α, β-ethylenically unsaturated nitrile monomer units (a1), conjugated diene monomer units (b1), and α, β-ethylenically unsaturated dicarboxylic acid monoester monomer units (d1), wherein at least part of the conjugated diene monomer units (b1) is hydrogenated;
a nitrile group-containing copolymer rubber [B] including not less than 30 wt % α, β-ethylenically unsaturated nitrile monomer units (a2) and conjugated diene monomer units (b2), wherein at least part of the conjugated diene monomer units (b2) may be hydrogenated; and
an amine-based cross-linking agent,
the nitrile group-containing copolymer rubber [A] and the nitrile group-containing copolymer rubber [B] being contained in the cross-linked rubber at a weight ratio of 20/80 to 80/20, and
the content of the α, β-ethylenically unsaturated dicarboxylic acid monoester monomer units (d1) in the nitrile group-containing copolymer rubber [A] is 6 wt % to 9.5 wt % of the total monomer units in the rubber.

2. The cross-linkable rubber composition according to claim 1, wherein the nitrile group-containing copolymer rubber [A] further includes (meth)acrylic acid alkoxyalkyl ester monomer units (c).

3. The cross-linkable rubber composition according to claim 1, wherein the nitrile group-containing copolymer rubber [A] has an iodine value of not more than 120.

4. The cross-linkable rubber composition according to claim 1, wherein the α, β-ethylenically unsaturated dicarboxylic acid monoester monomer units (d1) are units of mono n-butyl maleate.

5. A cross-linked rubber comprising:
a nitrile group-containing copolymer rubber [A] including less than 30 wt % α, β-ethylenically unsaturated nitrile monomer units (a1), conjugated diene monomer units (b1), and α, β-ethylenically unsaturated dicarboxylic acid monoester monomer units (d1), wherein at least part of the conjugated diene monomer units (b1) is hydrogenated; and
a nitrile group-containing copolymer rubber [B] including not less than 30 wt % α, β-ethylenically unsaturated nitrile monomer units (a2) and conjugated diene monomer units (b2), wherein at least part of the conjugated diene monomer units (b2) may be hydrogenated,
the nitrile group-containing copolymer rubber [A] and the nitrile group-containing copolymer rubber [B] being contained in the cross-linked rubber at a weight ratio of 20/80 to 80/20,
the nitrile group-containing copolymer rubber [A] and the nitrile group-containing copolymer rubber [B] being cross-linked with an amine-based cross-linking agent, and
the content of the α, β-ethylenically unsaturated dicarboxylic acid monoester monomer units (d1) in the nitrile group-containing copolymer rubber [A] is 6 wt % to 9.5 wt % of the total monomer units in the rubber.

6. A method for producing a cross-linked rubber, comprising:
mixing a nitrile group-containing copolymer rubber [A], a nitrile group-containing copolymer rubber [B], and an amine-based cross-linking agent at a weight ratio of the nitrile group-containing copolymer rubber [A]/the nitrile group-containing copolymer rubber [B] in a range of 20/80 to 80/20, thereby cross-linking the nitrile group-containing copolymer rubber [A] and the nitrile group-containing copolymer rubber [B] with the amine-based cross-linking agent,
the nitrile group-containing copolymer rubber [A] including less than 30 wt % α, β-ethylenically unsaturated nitrile monomer units (a1), conjugated diene monomer units (b1), and α, β-ethylenically unsaturated dicarboxylic acid monoester monomer units (d1),
wherein at least part of the conjugated diene monomer units (b1) is hydrogenated, the nitrile group-containing copolymer rubber [B] including not less than 30 wt % α, β-ethylenically unsaturated nitrile monomer units (a2) and conjugated diene monomer units (b2), wherein at least part of the conjugated diene monomer units (b2) may be hydrogenated, and
the content of the α, β-ethylenically unsaturated dicarboxylic acid monoester monomer units (d1) in the nitrile group-containing copolymer rubber [A] is 6 wt % to 9.5 wt % of the total monomer units in the rubber.

* * * * *